(12) United States Patent
Becker et al.

(10) Patent No.: US 7,578,557 B2
(45) Date of Patent: Aug. 25, 2009

(54) HINGE MOUNTINGS FOR A MOTOR VEHICLE SEAT WITH AT LEAST TWO STOPPER ARMS

(75) Inventors: Burckhard Becker, Solingen (DE); Wilfried Beneker, Leichlingen (DE); Reinhard Vogel, Erkrath (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 135 days.

(21) Appl. No.: 11/895,089

(22) Filed: Aug. 22, 2007

(65) Prior Publication Data
US 2008/0047106 A1    Feb. 28, 2008

(30) Foreign Application Priority Data
Aug. 22, 2006  (DE)  ......... 10 2006 039 222
Jun. 14, 2007  (DE)  ......... 10 2007 027 341

(51) Int. Cl.
*B60N 2/14*  (2006.01)
(52) U.S. Cl. ...................................... 297/367
(58) Field of Classification Search ............... 297/367
See application file for complete search history.

(56) References Cited

U.S. PATENT DOCUMENTS

| | | | | |
|---|---|---|---|---|
| 5,590,931 A * | 1/1997 | Fourrey et al. | ............... | 297/366 |
| 5,881,854 A * | 3/1999 | Rougnon-Glasson | ........ | 192/15 |
| 6,112,370 A * | 9/2000 | Blanchard et al. | ............ | 16/325 |
| 6,149,235 A * | 11/2000 | Fahim | ..................... | 297/259.2 |
| 6,666,515 B2 * | 12/2003 | Asano et al. | ................. | 297/366 |
| 7,188,905 B2 * | 3/2007 | Ham | ......................... | 297/367 |
| 7,341,311 B2 * | 3/2008 | Ohba | ......................... | 297/367 |
| 7,357,455 B2 * | 4/2008 | Becker et al. | ......... | 297/378.12 |
| 7,475,945 B2 * | 1/2009 | Reubeuze et al. | ........... | 297/367 |
| 2002/0175548 A1 * | 11/2002 | Asano et al. | ................. | 297/367 |
| 2003/0230923 A1 * | 12/2003 | Uramichi | .................... | 297/367 |
| 2005/0168034 A1 * | 8/2005 | Fast | ............................ | 297/367 |
| 2006/0012232 A1 * | 1/2006 | Coughlin et al. | ............ | 297/367 |
| 2006/0055222 A1 * | 3/2006 | Bonk et al. | ................. | 297/367 |
| 2006/0170269 A1 * | 8/2006 | Oki | ............................ | 297/367 |

(Continued)

FOREIGN PATENT DOCUMENTS

DE            3211158          9/1983

(Continued)

*Primary Examiner*—David Dunn
*Assistant Examiner*—James Alex
(74) *Attorney, Agent, or Firm*—McCarter & English, LLP

(57) ABSTRACT

A hinge mounting for a motor vehicle seat with one hinge axis, one actuation part, one first hinge part having an inner toothed surface centered with respect to the hinge axis, one second hinge part with at least one stop arm comprising a toothed region cooperating with the inner toothed surface, being disposed for pivotal movement about a pivot axis disposed on the second hinge part and comprising a projection and having an actuation region that cooperates with the actuation part, and with a control part that is connected to the first hinge part and comprises a cam for the projection to fit against, the cam comprising several portions, the engagement region being located between the front holding region and a rear holding region, that, when the projection moves from the front holding region to the rear holding region, a movable baffle associated with the engagement region bridges the interposed engagement region for preventing the projection from engaging therein, the baffle being inoperable when the projection moves in the opposite direction so that the projection is free to move into the engagement region.

17 Claims, 5 Drawing Sheets

U.S. PATENT DOCUMENTS

2007/0040436 A1* 2/2007 Oki .......................... 297/367

FOREIGN PATENT DOCUMENTS

| EP | 0 694 434 B1 | 1/1996 |
| EP | 1260405 A1 | 11/2002 |
| WO | WO2005/044617 A1 | 5/2005 |

* cited by examiner

HINGE MOUNTINGS FOR A MOTOR VEHICLE SEAT WITH AT LEAST TWO STOPPER ARMS

CROSS REFERENCE TO RELATED APPLICATIONS

This application claims priority to German Application No. DE 10 2006 039 222.1, filed Aug. 22, 2006, and German Application No. DE 10 2007 027 341.1, filed Jun. 14, 2007, both of which are expressly incorporated by reference in their entirety as part of the present disclosure.

BACKGROUND

The invention relates to a hinge mounting for a motor vehicle seat with one hinge axis, with one actuation part movable between a stop position and a release position, with one first hinge part having an inner toothed surface centered with respect to the hinge axis, with one second hinge part that, in the release position of the actuation part, is rotatable about the hinge axis relative to the first hinge part and that, in a stop position of the actuation part is not movable relative to the first hinge part, with at least one stop arm comprising a toothed region cooperating with the inner toothed surface, the stop arm being disposed on the second hinge part and being movable with respect thereto, comprising a projection and having an actuation region that cooperates with the actuation part, the actuation part not biasing the toothed regions of the stop arms into engagement with the inner toothed surface when in the release position, and the first hinge arm being displaceable relative to the second hinge arm and the actuation part biasing the toothed regions of the stop arm into engagement with the inner toothed surface in the stop position, and with a control part that is connected to the first hinge part and comprises a cam for the projection to fit against, the cam comprising several portions including a front holding region that is so far from the inner toothed surface that the toothed region of the stop arm is not allowed to come into engagement with the inner toothed surface and an engagement region that is sufficiently close to the inner toothed surface for the toothed region of the stop arm to come into engagement with the inner toothed surface.

Such a hinge mounting is known from EP 0 694 434 B1. In this hinge mounting, the stop arms are configured to be radially movable stop bars. The cam only consists of one holding region and one engagement region, the engagement region being just sufficiently wide for the projection to be capable of engaging therein. The arrangement is used for a memory device as it is found in motor vehicle seats for motor vehicles having only one door on either side for accessing the rear seats.

The invention, by contrast, substantially relates to a vehicle seat of the second seat row and to the effort to configure the trunk compartment located behind to be variable. For this purpose, the backrest of the motor vehicle seat is intended to be adjustable in different positions, namely in a substantially vertical position on the one side and in a position in which it is tilted as far as possible forward onto the seat pan on the other side, with the possibility to be locked in either of these positions. This feature offers two possibilities of enlarging the trunk compartment volume, the latter allowing for the larger trunk compartment volume. Furthermore, in such a vehicle seat, the backrest is intended to be adapted for fine adjustment within a normal range of utilization. The position referred to as construction position in which the seat is delivered for mounting into a motor vehicle is also within this range of utilization.

Further reference is made to the documents WO 2005/044617 A1, EP 1 260 405 A1 and DE 32 11 158 A1. Such type hinge mountings have proved efficient.

It is the object of the invention to develop hinge mountings preferably suited for use in the second row of seats and for varying the volume of the trunk compartment and to improve the hinge mountings of the type mentioned herein above so that it is readily adjustable in the different positions.

SUMMARY

In view of the hinge mountings mentioned herein above, this object is achieved in that the engagement region is located between the front holding region and a rear holding region, that, when the projection moves from the front holding region to the rear holding region, a movable baffle associated with the engagement region bridges the interposed engagement region for preventing the projection from engaging therein, the baffle being inoperable when the projection moves from the rear holding region to the front holding region so that the projection is free to move into the engagement region.

This hinge mountings can only be locked in one pivotal direction in the position associated with the engagement region, in the other one it cannot. If the seat is moved in the other pivotal direction beyond the engagement region, the engagement region is ineffective. In the preferred implementation, the backrest can be pivoted forward from the normal position of utilization into the vertical position and locked in this 90 degree position in which the projection is free to engage into the engagement region. If the backrest is tilted farther forward from this position and then again pivoted backward into the normal position of utilization, the projection is prevented from engaging into the engagement region by the baffle. Then, the baffle covers the opening of the engagement region so that the projection is not allowed to engage therein. This means that once the backrest has been pivoted forward beyond the engagement region, the engagement region is not noticeable when the backrest is moved back, it has no function. It only performs a function when the backrest is tilted forward into the upright position from a position behind the upright position.

In a preferred developed implementation, the cam further has a fine adjustment region that is disposed at the end of the rear holding region which is remote from the engagement region. This fine adjustment region is associated with a backward inclined adjustment of the backrest, meaning with the normal range of utilization. The distance separating the fine adjustment region from the inner toothed surface is smaller than the clear distance between the projection and the toothed region so that the projection is ineffective within the range in which the backrest is located in the normal position of utilization. The same applies to the engagement region and a detent gap region.

The backrest cannot be locked if the projection fits against a holding region. The front holding region is located in front of the engagement region. A rear holding region is located between the normal position of utilization and the vertical position.

Another advantage is that there is provided a detent gap at the end of the second holding region which is remote from the engagement region, this detent gap being sufficiently close to the inner toothed surface for the toothed region of the stop arm to come into engagement with the inner toothed surface. The detent gap makes it possible to lock the backrest in its almost horizontal position. By virtue of the second holding region, the backrest cannot be locked between this position and the vertical position. The projection prevents locking.

Preferably, the stop arms are constantly biased in their stop position by an elastic means. As a result, their projection constantly fits against the cam. Additionally, they engage better in their respective locking position. Engagement is separated from locking, engagement occurring under the action of the elastic means and locking, under the action of the actuation part. Starting from the release position, locking occurs as follows: The elastic means urges the stop arms into the stop position before the actuation part is pivoted so far that it is capable of causing itself this movement of the stop arms. The actuation part is only utilized to complete and secure the stop position of the stop arms. Accordingly, the stop position is achieved in two steps. At first, the elastic means causes the stop arms to move into their stop position; then, this stop position is mechanically secured and maintained by the actuation part. Only the actuation part is capable of fixing the stop arms so that crash loads may be absorbed, the elastic means is not capable thereof. The elastic means is only implemented so as to be capable of moving the stop arms into their stop position; its elastic force does not go beyond that.

In a preferred developed implementation, the actuation part has one arm for a respective one of the stop arms, the arm being associated with the respective one of the stop arms, and the stop arms each have a release flank that cooperates with this associated arm. The stop arm is actively moved out of a stop position through the release flank.

If the stop arm axis is quite near the inner toothed surface and if the other geometrical conditions are heeded, at least one stop arm is always self-stopping, irrespective of the direction of rotation. In both directions of rotation, the behaviour is mixed since at least one stop arm is in an automatic, preferably self-locking stop condition irrespective of the direction of rotation of an applied torque and only the at least one other stop arm of the same generic type must be retained in its stop position by the actuation part. Accordingly, the hinge mountings behave independently of the direction of rotation with respect to torques applied from the outside.

The number of stop arms is adapted to the requirements. It is provided and preferred to provide more than two stop arms. The minimum number of stop arms is one. If three stop arms are utilized for example, two may be left-handed and one right-handed or vice versa. The number of the right-handed stop arms, which is at least one, is equal or not equal to the number of left-handed stop arms, which also is at least one. If an odd number of stop arms is provided, a stop arm is biased separately by a spring of its own acting as the elastic means.

In operation, the pivot angle of the stop arm between the stop position and the release position is quite small. The pivot angle is less than 5 degrees.

The fulcrum of the stop arm is as close to the inner toothed surface as possible. The position of the fulcrum in proximity to the inner toothed surface has the advantage that the geometrical conditions are favourable when the toothed region is pivoted into the inner toothed surface and also when it is pivoted out thereof. Undercuts are avoided.

It is preferred that the first hinge part and the second hinge part define a space accommodating the stop arms, the actuation part and the elastic means and having the shape of a flat cylinder. No additional space is needed for the elastic means; it is interposed in the space between two stop arms. It preferably needs no fixture of its own and is fixed in recesses instead. It is easy to mount, more specifically through plugging.

BRIEF DESCRIPTION OF THE DRAWINGS

Other features and advantages will become more apparent upon reviewing the appended claims and the following non restrictive description of embodiments of the invention, given by way of example only with reference to the drawing. In the drawing:

DETAILED DESCRIPTION

Figure 1:
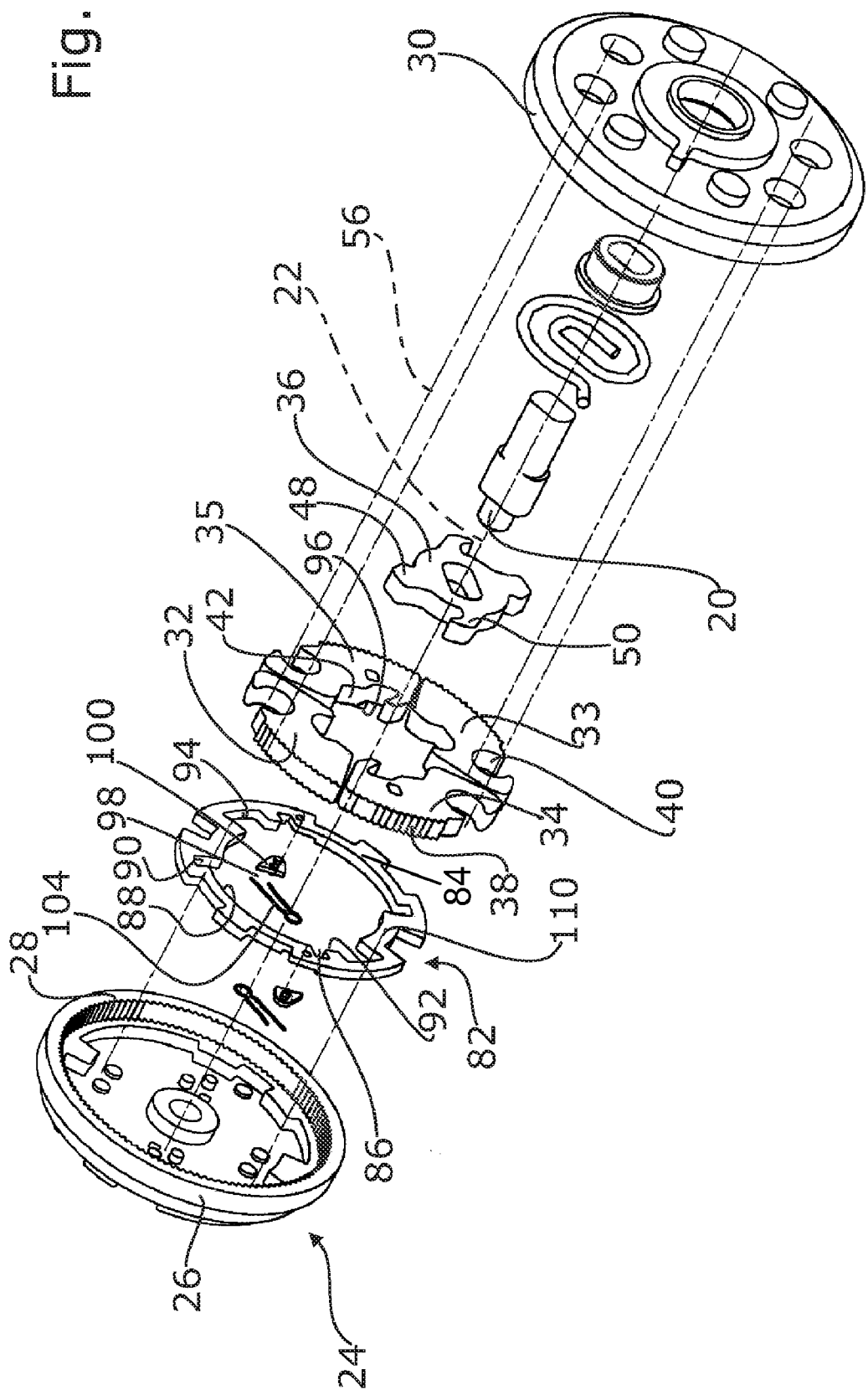
FIG. 1: is a perspective illustration of a hinge mounting in the form of an assembly drawing.

As can be seen from FIG. 1, the hinge mounting has a hinge axis 20 that is centered on an axis line 22. The hinge axis 20 has an in parts round and in parts rounded rectangular cross section. There is further provided a first hinge part 24 that has substantially the shape of a shell in the exemplary embodiment shown. A blank having the shape of a circular disk is machined, more specifically embossed, in such a manner that a central region is offset with respect to a border region 26. An inner toothed surface 28 is formed, which bounds the border region 26 toward the inside. There is further provided a second hinge part 30 that is substantially also designed to have the shape of a circular disk. Both hinge parts 24, 30 have means for connecting them to parts of a motor vehicle seat (not shown), which are intended to be adjusted with respect to each other. This will be discussed herein after. When assembled, both hinge parts 24, 30 define a hollow space that has substantially the shape of a flat cylinder. In this hollow space there are located four stop arms 32, 33, 34, 35 and at least one actuation part 36 as well as other parts that will be discussed herein after.

The stop arms 32, 33, 34, 35 are identical two by two, namely the left-handed stop arms 32, 33 and the right-handed stop arms 34, 35. Each stop arm 32-35 has a toothed region 38 that is adapted to the inner toothed surface 28. The toothed region 38 extends over approximately 45 degrees, when viewed from the axis line 22, and has a plurality of teeth, as best seen in the FIGS. 2 and 3.

Generally, a stop arm needs a sector of about 80 degrees so that four stop arms in all may be accommodated in the implementation shown. Offset with respect to the toothed region 38, each stop arm 32-34 has a bearing 40 that is configured to be a recess or bight that is open toward the inner toothed surface 28 and is bounded by an arc of a circle. Finally, each stop arm 32-35 has an actuation region 42. The actuation region 42 includes a clamping flank 44 on the one side and a release flank 46 on the other side.

The actuation part 36 has a noncircular hole that is adapted to the hinge axis 20. It is connected to this hinge axis 20. In the implementation shown, the actuation part 36 has four arms

48, 49, 50, 51, namely one arm for each stop arm 32-35. Two identically built first arms 48, 49 and two identically built second arms 50 are provided, which are adapted to the stop arms. The second arms cooperate with the right-handed stop arms 34. It can be seen that the clamping flanks 44 of the stop arms 32-35 substantially coincide and are located on the same radius, with the release flanks 46 being however different from one another. Accordingly, the respectively adapted arms also differ from each other. As can be seen from the Figs., the arms 48-51 engage like a head into recesses that are respectively formed in the stop arms 32-34, thus forming a kind of hinge. As a result, each of the arms 48-51 is capable of pulling the respective associated stop arm 32-35 out of the engagement position into the release position and in particular also of retaining it in the release position and in intermediate positions, this being important for the functioning of the hinge mountings.

The actuation part 36 has a clearance in its two flats so that it is allowed to position itself optimally within the four clamping flanks 44.

As can be seen from the Figs., the stop arms 32-35 and the actuation part 36 are configured to be flat punched parts and are in particular made from sheet steel although they may also be sintered parts. In any case, their overall height is such that they fit into the hollow space defined by the two hinge parts 24, 30. On the second hinge part 30 there are provided bores for bearing pins that have not been illustrated herein and that engage into the bearings 40. The stop arms pivot about pivot axes 56.

The housing formed by the two hinge parts 24, 28 is closed toward the outside by an external ring (not shown). This ring retains the two pivoting parts 24, 30 in position, both in the axial and in the radial direction. The mountings are preferably envisaged for connecting a seat frame to a backrest, this is to say that it is intended to be used as what is referred to as a backrest mountings.

Figure 2:
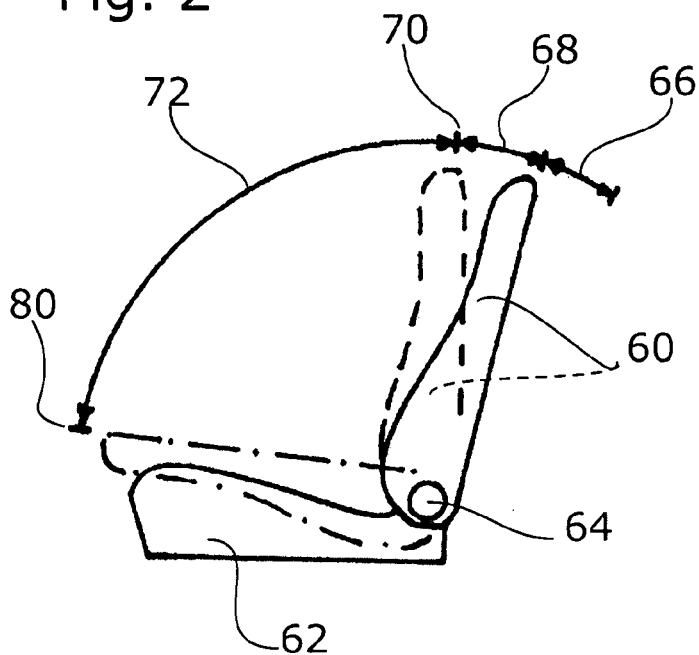
FIG. 2: is a schematic side view of a motor vehicle seat equipped with a hinge mounting as shown in FIG. 1, for illustrating the adjustment regions.

The motor vehicle seat, which is schematically shown in FIG. 2, has a backrest 60 and a seat 62 that are connected together through the hinge mountings 64. The backrest 60 can be brought into different positions that are shown by the curved line above the seat. On the extreme right, meaning when tilted backward, this curved line shows a zone of utilization 66, also referred to as fine adjustment zone, within which the backrest 60 can be adjusted according to the user's wishes. The motor vehicle seat is illustrated in the construction position, which is located at the front end of the zone of utilization 66. From there and up to the 90 degree position, which is shown by a discontinuous line in FIG. 2, there extends a rear holding zone 68 in which the backrest 60 cannot be locked by means of the hinge mountings 64. In the 90 degree position, there is an engagement zone 80 and the backrest may be locally locked. This zone is adjoined with a front retaining zone 72 that extends over almost 90 degrees and in which the backrest 60 cannot be locked. In the position shown by a dash-dot line in FIG. 2, in which the backrest is pivoted furthermost forward, there is located the front engagement zone 80. This zone is also local, that is to say that it is confined to the concrete angular position, plus/minus a few angular degrees at the most.

The function described in FIG. 2 is now reached as follows within the hinge mounting: A control part 82, which may be configured integral with the first hinge part but which, in the implementation shown, is a separate annular part that may be placed into the first hinge part 24 so as to be secured against rotation, is associated with the first hinge part 24. It has a cam 84 having several portions that will be discussed in further detail herein after. It has an engagement region 86 in the form of a pocket that is associated with the 90 degree position 70. It is adjoined on the one side with a front holding region 88 which in turn is adjoined with a detent gap region 90, which is associated with the front engagement zone 80. In the other direction, starting from the engagement region 86, this engagement region is adjoined with a rear holding region 92 that extends over a substantially smaller angle than the front holding region 88 and that is associated with the front holding zone 72. This rear holding region 92 is adjoined with a fine adjustment region 94 that extends over about 15° and is associated with the zone of utilization 66.

At least one of the stop arms 32-35, two in the implementation shown, namely the stop arms 34 and 35, which are of the same type, are provided with a projection 96 that protrudes from their plane and constantly fits against the cam 84. Abutment is achieved by the fact that the stop arms are elastically biased in the stop position by elastic means 108 (see FIG. 3).

When the two hinge parts 24, 30 move relative to each other, the projection 96 glides over the cam 84 and gets to interact with the discrete regions thereof. The distance separating the two holding regions 88, 92 from the inner toothed surface 28 is greater than the clear distance between the projection 96 and the toothed region 38. As a result, the projection 96, as long as it rests on one of the holding regions 88, 92, prevents the associated stop arm from engaging the inner toothed surface 28. The engagement region 86, the detent gap region 90 and the fine adjustment region 94, by contrast, are so close to the inner toothed surface 28 that the projection 96 is not in contact therewith if the associated stop arm engages the inner toothed surface 28. Accordingly, the projection 96 does not prevent the stop arm from moving into the engagement position.

Figure 3:
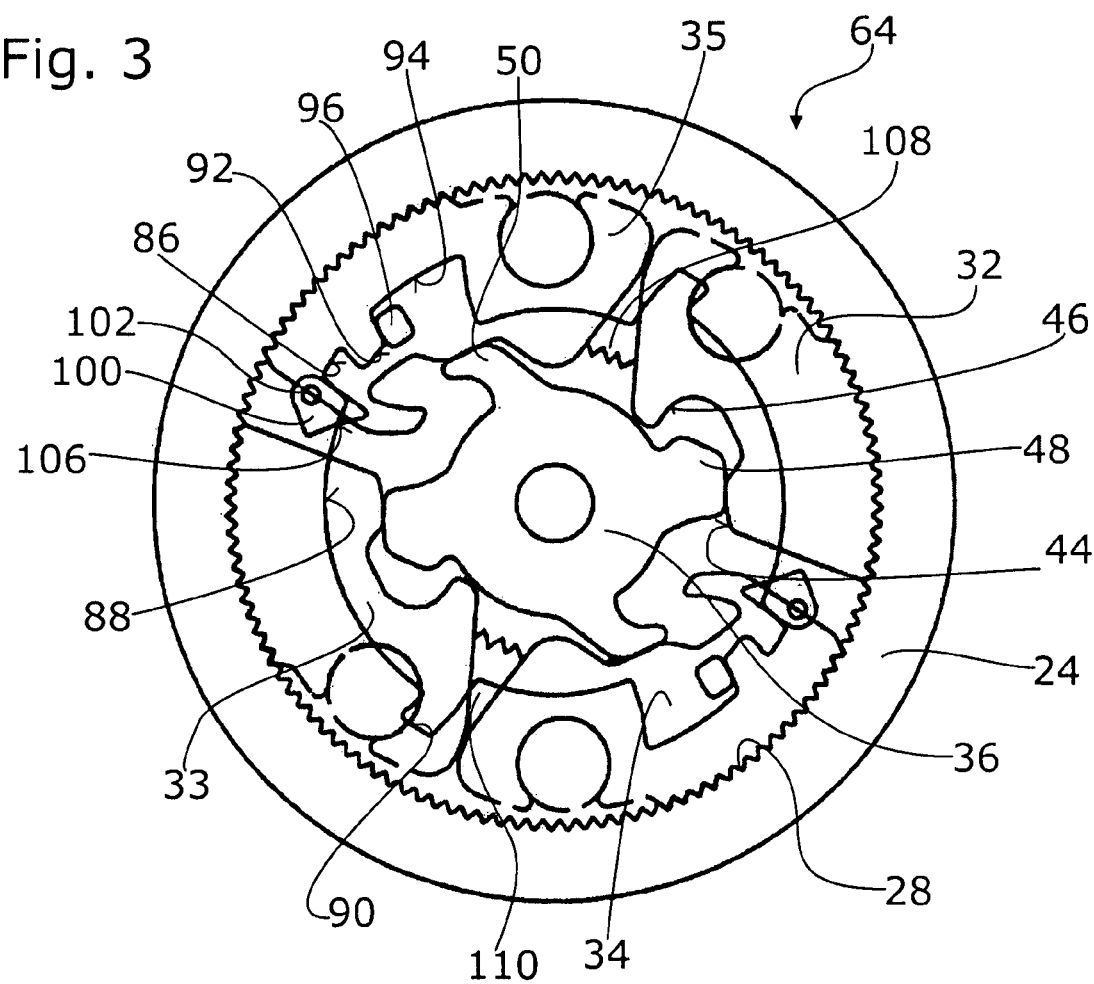
FIG. 3: is a view of the hinge mountings in the axial direction, viewed from the first hinge part including its inner toothed surface in the direction of the second hinge part, the backrest is located in the position of construction, coming from the position shown in FIG. 3.

The engagement region 86 is located between the front holding region 88 and the rear holding region 92. In order for the projection 96 or the dog to only be allowed to fall into the engagement region 86 from one direction of rotation but not from the other, there is provided a baffle 98. For this purpose, a bridging part 100 is carried on the control part 82 for pivotal movement about an axis 102, in immediate proximity to the engagement region 86 and in the region of the front holding region 88. A spring 104 biasing the bridging part 100 in the position of rest shown in FIG. 3 is associated with the bridging part 100. The bridging part has a flank 106. In the illustration shown in FIG. 3, this flank extends across the course of the contour of the front holding region 88, intersecting it. The bridging part 100 has a nose that projects inward beyond the contour of the front holding region 88.

Adjustment of the backrest 60 starting from a position behind the 90° position 70, for example starting from the construction position shown in FIG. 3, occurs as follows:

If the hinge mounting is liberated by actuating the actuation part 36, this actuation part pulls the stop arms inward, meaning out of engagement with the inner toothed surface 28. As a result, the projection 96 is caused to move so far inward that it is inside the rear holding region 92 and that the mounting is allowed to pivot. After pivotal movement by a certain angle, the 90° position 70 is achieved and one has the condition shown in FIG. 4: The projection 96 is in the same angular position as the engagement region 86. If the hinge mounting is now released, meaning if the actuation part 36 is no longer actuated, the stop arms 32 through 35 are allowed to pivot outward and to engage the inner toothed surface 28. They are allowed to do so without the projection 96 hitting one of the two holding regions 88, 92 and without it preventing the stop arms 32-35 from engaging into the inner toothed surface 28. The backrest may thus be locked in the 90° position 70. The backrest self-locks in the 90° position 70 if the actuation part 36 has been released before the 90° position has been reached.

If the hinge mounting 64 is actuated again, that is if the actuation part 36 is rotated, the stop arms 32-35 are pulled free again and the position shown in FIG. 4 is again achieved.

Figure 4:
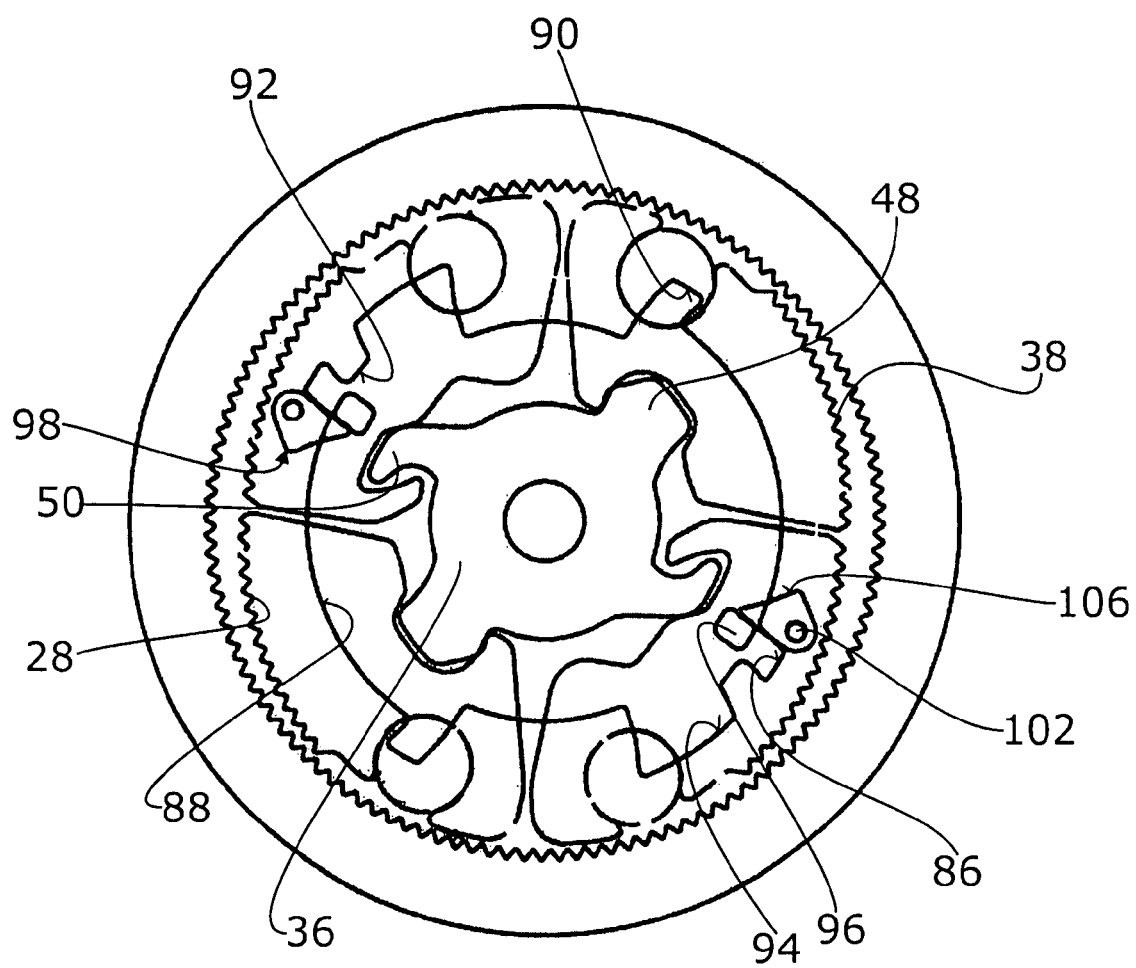
FIG. 4: is a view like FIG. 3, with the backrest being now brought from the position shown in FIG. 3 into the 90 degree position.
Figure 5:
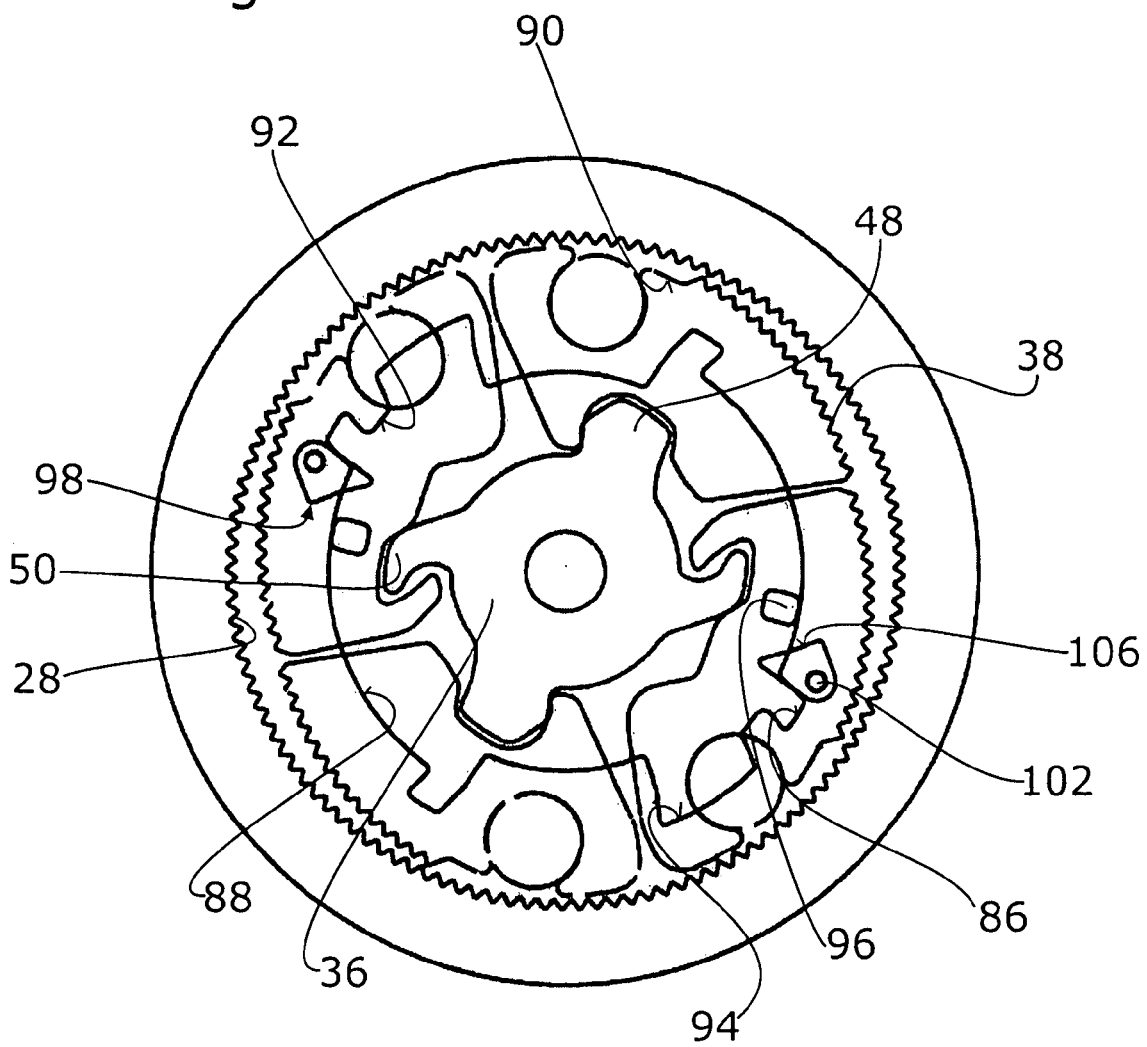
FIG. 5: is a view like FIG. 3, with the backrest now being in a front holding zone.

In FIG. 4, the projection 96 abuts the nose. If, starting from the illustration shown in FIG. 4, the projection 96 now comes closer to the bridging part 100, the projection 96 pushes the bridging part 100 out of the way, that is to say it causes it to pivot clockwise until it has left the contour of the front holding region 88. The position shown in FIG. 5 is reached. In the illustration shown in FIG. 5, the projection 96 is within the front holding region 88 and prevents the stop arm 34, 35 provided thereon from engaging the inner toothed surface 28.

Starting from the position shown in FIG. 5, the backrest 60 is allowed to tilt further forward into the front engagement zone 80 in which the projection 96 engages the pocket forming the detent gap 90.

Figure 6:
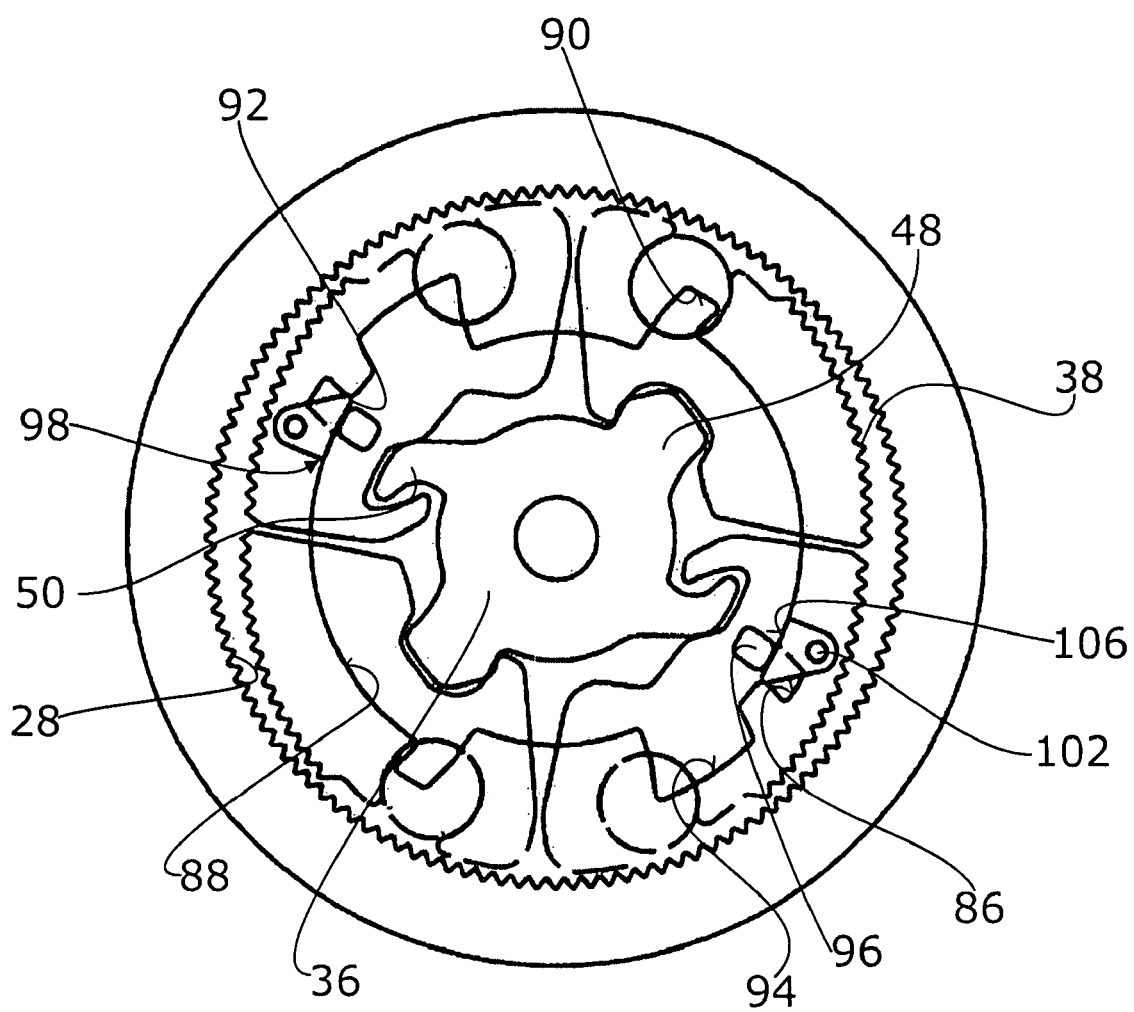
FIG. 6: is an illustration like FIG. 3, with the backrest having now been returned to the 90 degree position, this time coming from the front retaining zone.

If, starting from FIG. 5, the backrest 60 is pivoted upward though, the projection 96 comes to bear against the flank 106 of the bridging part 100. If it continues to move, the projection pushes the bridging part 100 out of the way and causes it to pivot, this time counter-clockwise, about the axis 102 until it reaches the position shown in FIG. 6. In this position, the bridging part 100 is prevented from pivoting further counter-clockwise by a limit stop that has not been illustrated herein. It now bridges the engagement region 86. Put another way, it connects the two holding regions 88, 92 as if the engagement region 86 did not exist. The contour of the front holding region 88 merges then directly and continuously into the contour of the rear holding region 92.

In the implementation shown, only the two stop arms 34, 35 are provided with a projection 96, the other two are not. As shown in FIG. 5 for example, the two other stop arms 32, 33 are not engaged either. This is achieved by the hinge connection described herein above, meaning by the head-like engagement of the arms 48-51 into the actuation regions 42 of the stop arms. By virtue of this engagement, the stop arms that have no projection 96 cannot engage either, they are rather retained in the intermediate position in which the stop arms 34, 35 also are. The cams 84 extend over more than 90°, they are for example in the range of 110°. Each of the four stop arms 32-35 cannot be provided with a cam 84 of its own, for the cams 84 would overlap. In that the stop arms are retained in mutual engagement with the actuation part 36, the stop arms need not all have their own projection 96.

The control part 82 forms two cams 84. The two cams 84 are separated by two intermediate parts 110.

What is claimed is:

1. A hinge mounting for a motor vehicle seat comprising:
    a hinge axis;
    an actuation part movable between a stop position and a release position;
    a first hinge part having an inner toothed surface centered with respect to the hinge axis;
    a second hinge part that, in the release position of the actuation part, is rotatable about the hinge axis relative to the first hinge part and that, in a stop position of the actuation part, is not movable relative to the first hinge part;
    at least one stop arm comprising a toothed region cooperating with the inner toothed surface, the stop arm being disposed for pivotal movement about a pivot axis disposed on the second hinge part and comprising a projection and having an actuation region that cooperates with the actuation part, the actuation part not biasing the toothed regions of the stop arms into engagement with the inner toothed surface when in the release position, and the first hinge part being displaceable relative to the second hinge part and the actuation part biasing the toothed region of the stop arm into engagement with the inner toothed surface in the stop position;
    a control part connected to the first hinge part and comprising a cam for the projection to fit against, the cam comprising several portions including a front holding region that is remote from the inner toothed surface and the toothed region of the stop arm remains out of engagement with the inner toothed surface and an engagement region that is sufficiently close to the inner toothed surface for the toothed region of the stop arm not to be prevented from coming into engagement with the inner toothed surface; and
    a movable baffle, wherein the engagement region is located between the front holding region and a rear holding region, that, when the projection moves from the front holding region to the rear holding region, the movable baffle associated with the engagement region bridges the interposed engagement region for preventing the projection from engaging therein, the baffle being inoperable when the projection moves from the rear holding region to the front holding region so that the projection is free to move into the engagement region.

2. The hinge mounting as set forth in claim 1 for a backrest hinge that is connected to a backrest, wherein the engagement region is associated with a position of the backrest that is substantially a vertical position of the backrest.

3. The hinge mounting as set forth in claim 1, wherein the maximum length of the engagement region is about 1.5 times the corresponding dimension of the projection.

4. The hinge mounting as set forth in claim 1, wherein the cam further comprises a fine adjustment region that is disposed at the end of the rear holding region that is remote from the engagement region.

5. The hinge mounting as set forth in claim 1, wherein a detent gap region is provided that is provided at the end of the front holding region that is remote from the engagement region and that this detent gap region is close to the inner toothed region and the projection is not fitting against the detent gap region but is in vicinity thereto when the toothed region of the stop arm engages the inner toothed region.

6. The hinge mounting as set forth in claim 1, wherein the stop arm is disposed so as to be pivotal about a pivotal axis that is fixed to the second hinge part.

7. The hinge mounting as set forth in claim 1, wherein there is provided at least one left-handed and at least one right-handed stop arm.

8. The hinge mounting as set forth in claim 1, wherein the stop arms each comprise front faces that are turned toward each other in immediate neighbourhood to each other and that an elastic means is disposed between the front faces.

9. The hinge mounting as set forth in claim 8, wherein the elastic means is a spring, and that this spring is applied to a first abutment point on the left-handed stop arm and to a second abutment point on the right-handed stop arm.

10. The hinge mounting as set forth in claim 1, wherein the first hinge part, the second hinge part and the actuation part each are flat sheet metal parts.

11. The hinge mounting as set forth in claim 1, wherein the first hinge part and the second hinge part define a space in which there are located the stop arms, the actuation part and the control part and that has the shape of a flat cylinder.

12. The hinge mounting as set forth in claim 1, wherein the baffle comprises a bridging part that is carried on the control part for pivotal movement about an axis and a spring and that the spring elastically biases the bridging part in a neutral position from which the bridging part is deflectable in both directions of rotation.

13. The hinge mounting as set forth in claim 12, wherein the bridging part has a flank that is longer than the width of the engagement region measured in the circumferential direction and that the flank intersects the front holding region in the neutral position.

14. The hinge mounting as set forth in claim 12, wherein the flank bridges the engagement region in a deflected position of the bridging part and connects together the two holding regions.

15. The hinge mounting as set forth in claim 9, wherein the spring is a compression spring or a tension spring.

16. The hinge mounting as set forth in claim 1, wherein the first hinge part, the second hinge part and the actuation part each are flat embossed sheet metal parts.

17. The hinge mounting as set forth in claim 1, wherein the maximum length of the engagement region is at least long enough for the engagement region to receive the projection.

\* \* \* \* \*